(12) United States Patent
Liberman

(10) Patent No.: US 7,658,852 B2
(45) Date of Patent: Feb. 9, 2010

(54) RO MEMBRANE CLEANING METHOD

(75) Inventor: Igal Liberman, Tel Aviv (IL)

(73) Assignee: Membrane Recovery Ltd, Tel Aviv (IL)

( * ) Notice: Subject to any disclaimer, the term of this patent is extended or adjusted under 35 U.S.C. 154(b) by 355 days.

(21) Appl. No.: 11/629,630

(22) PCT Filed: May 19, 2005

(86) PCT No.: PCT/IL2005/000514

§ 371 (c)(1),
(2), (4) Date: Dec. 15, 2006

(87) PCT Pub. No.: WO2005/123232

PCT Pub. Date: Dec. 29, 2005

(65) Prior Publication Data

US 2007/0181497 A1 Aug. 9, 2007

(51) Int. Cl.
*B01D 65/02* (2006.01)
(52) U.S. Cl. .................. 210/636; 210/639; 210/637
(58) Field of Classification Search .............. 210/636, 210/639, 637
See application file for complete search history.

(56) References Cited

U.S. PATENT DOCUMENTS

| | | | |
|---|---|---|---|
| 3,827,976 A | 8/1974 | Stana et al. | |
| 3,853,756 A | 12/1974 | Stana | |
| 3,923,654 A * | 12/1975 | O'Hern et al. | 210/500.25 |
| 3,992,301 A * | 11/1976 | Shippey et al. | 210/636 |
| 4,169,789 A * | 10/1979 | Lerat | 210/636 |
| 4,321,137 A * | 3/1982 | Kohler | 210/137 |
| 6,254,779 B1 * | 7/2001 | Jeffery et al. | 210/620 |
| 6,568,282 B1 * | 5/2003 | Ganzi | 73/861.42 |

FOREIGN PATENT DOCUMENTS

EP 0 768 112 A1 4/1997

(Continued)

OTHER PUBLICATIONS

Sagiv, A., et al., "Backwash of RO spiral wound membranes", Abstract of Presentation on Conference, European Desalination Society, Conference Membranes in Drinking and Industrial water production, L'Aquila Italy, Nov. 15-17, 2004. pp. 150-151, No. 934.

(Continued)

*Primary Examiner*—Walter D Griffin
*Assistant Examiner*—Denise R Anderson
(74) *Attorney, Agent, or Firm*—The Nath Law Group; Derek Richmond; Joaxiao Zhang

(57) ABSTRACT

Direct-osmosis (DO) method for cleaning a semi-permeable membrane in a RO separation module, the membrane having a feed side with foulant located thereon, and an opposite permeate side. A normal RO separation process in the same module includes: feeding, under gauge pressure PGr, raw saline solution having osmotic pressure POr to the membrane feed side; collecting permeate (solvent) having osmotic pressure POp from the permeate side, under gauge pressure PGp; and removing residual brine from the membrane feed side. The method comprises feeding to the feed side of the membrane, for a predetermined injection time, super saline solution having osmotic pressure POs>POr, such that backward flow of permeate towards the feed side of the membrane is provided so as to lift the foulant from the feed side.

21 Claims, 7 Drawing Sheets

FOREIGN PATENT DOCUMENTS

| | | | |
|---|---|---|---|
| EP | 0768112 A1 | * | 4/1997 |
| EP | 0 899 238 A1 | | 3/1999 |
| EP | 0899238 A1 | * | 3/1999 |
| JP | 51-51153 | | 5/1976 |
| JP | 01-119306 | | 5/1989 |
| JP | 11-169688 | | 6/1999 |
| JP | 2000-079328 | | 3/2000 |
| JP | 2000079328 A | * | 3/2000 |
| WO | 2004/062774 A2 | | 7/2004 |

OTHER PUBLICATIONS

Liberman, B., et al., "Backflushable RO membranes", Presentation on Conference, European Desalination Society, Conference Membranes in Drinking and Industrial water production, L'Aquila Italy, Nov. 15-17, 2004.

Liberman, B., et al., "Replacing membrane CIP by Direct Osmosis cleaning", *Desalination and Wate Reuse Quarterly*, (Aug./Sep. 2005).

Advertising leaflet, "Replacing CIP membrane by Direct Osmosis Cleaning", Dogma Lili Derish, (Aug. 2005).

Lee, S., et al., "Salt cleaning of organic-fouled reverse osmosis membranes", *Water Research*, vol. 41, pp. 1134-1142, (2007).

* cited by examiner

RO MEMBRANE CLEANING METHOD

This is a National Phase Application filed under 35 U.S.C. 371 as a national stage of PCT/IL2005/000514 filed on May 19, 2005, an application claiming the benefit under 35 USC 119(e) U.S. Provisional Application No. 60/580,915 filed on Jun. 21, 2004, the content of each of which is hereby incorporated by reference in its entirety.

FIELD OF THE INVENTION

This invention relates to cleaning of reverse osmosis (RO) membranes such as used in sea and brackish water desalination technology, for municipal and industrial water production, in particular to cleaning by direct osmosis.

BACKGROUND OF THE INVENTION

The process of reverse osmosis (RO) desalination of raw water includes basically the following:

- providing a semi-permeable membrane (RO membrane) which allows passing of the solvent (water) molecules and rejects dissolved salts, and disposing the RO membrane in a suitable vessel;
- feeding the raw water to one side of the RO membrane ("feed" side) under gauge pressure higher than the osmotic pressure of the raw water;
- collecting permeated desalinated water from the other side of the membrane ("permeate" side); and
- removing concentrated saline water ("brine") from the feed side (also called "feed-brine" side).

Raw water used as a source for desalination by reverse osmosis, besides dissolved solids (salts), includes suspended particles, organic and mineral, collectively called suspended solids. Standard desalination technology includes a filtration system called "pretreatment" system which is designated to remove the suspended solids. Pretreatment systems remove a significant part of the suspended solids, but are not able to remove them absolutely. Some of the suspended solids pass the pretreatment system, reach the RO membrane and stick to its feed surface as "foulants".

The foulants accumulated on the membrane surface provide favorable conditions for growth of bacteria. This is referred to as bio-fouling, and is the most brutal form of fouling.

Some dissolved salts may also precipitate on the membrane surface, forming scale. The RO desalination process is designed according to the solubility limits of sparingly soluble salts. Sometimes super-saturation conditions can occur. Desalination close to the saturation limits may cause formation of micro-crystals, which serve as nucleation centers. These micro-crystal particles typically don't cause problems, but under certain conditions can grow and create severe scaling of the membrane.

As seen from the above, not only suspended solids may foul the membrane surface. Consequently, in this description, raw water after pretreatment will be called raw saline solution, and will be considered to comprise solvent (water), dissolved salts and a potential foulant.

A fouled membrane has reduced separability of the dissolved salts and increased pressure losses and, therefore, has to be cleaned.

Common methods for cleaning the foulants from the feed membrane side involve stopping the RO desalination process and pumping cleaning chemical solutions along the feed-brine side to wash the fouled membrane surface. Such methods are costly, not very effective, and create environmental problems.

More effective methods for membrane cleaning are based on using direct osmosis (DO) for creating permeate backwash flow through the RO membrane. Such flow can lift the fouling from the membrane surface so that it can be removed with the brine stream.

Publications EP0768112 and JP2000-079328 disclose implementations of the direct osmosis method of membrane cleaning. They suggest that when the RO membrane is cleaned, the RO process of permeate production is stopped, but the raw saline solution is still supplied to the feed side of the membrane, essentially without pressure (or at least under pressure lower than the osmotic pressure of the solution). Permeate is supplied to the permeate side of the membrane also without pressure.

Patent application WO2004/062774 suggests increasing the gauge pressure at the permeate side of the membrane to a level slightly below the feed pressure of raw saline solution. This is done by back pumping the permeate for a few seconds. As the osmotic pressure of the raw saline solution is much higher then the osmotic pressure of the permeate, the net balance of pressures provides power for the direct osmosis process and membrane cleaning. This method avoids stopping of feed pumps and/or decreasing the feed side pressure so that the RO process can be easily resumed. However, this method requires that high-pressure permeate pump and expensive stainless-steel permeate ports, permeate collection piping system, high pressure valves, etc. are employed instead of low-cost plastic equipment that is usually used at the permeate side. Hardware replacement may increase significantly the cost of desalinated water.

SUMMARY OF THE INVENTION

In this application, a few terms will be used conventionally as follows:

Reverse Osmosis membrane will denote any semi-permeable membrane, spiral, hollow-fiber, flat sheet, etc which operates by rejecting certain ions. For example, Nano-Filtration (NF) membranes which mainly reject bivalent ions such as $Ca^{+2}$, $Mg^{+2}$, $SO4^{-2}$, are a variety of RO membranes.

Super-saline solution means solution with a salt concentration substantially higher than the raw saline solution (raw water) used for desalination;

Bacteria will include here other microorganisms causing bio-fouling, such as algae and fungi.

The above-presented direct osmosis cleaning processes have a number of disadvantages stemming from some peculiarities of the osmotic processes in desalination membranes.

The RO process can be maintained for virtually unlimited time, whereas the direct osmosis process can be conducted for only a few seconds and only immediately after the RO process stops. This definite relationship between the reverse and direct osmosis processes is based on the fact that the power required for direct osmosis comes from the difference in salt concentration on the two sides of the membrane, which is provided by the RO process. The direct osmosis process will stop in a few seconds after the reverse osmosis process stops, due to two processes taking place simultaneously;

Salt transfer through the membrane which lasts until equalization of the concentration at both sides (although the membrane is semi-permeable, it does not absolutely stop salt transfer);

Salt concentration on the membrane permeate side increases due to the direct osmosis process as water passes to the feed side.

Due to the fact that the DO process takes place along the whole surface of every membrane in one RO module in the same time, permeate pressure is coming to vacuum and there is not enough permeate to reach peripheral areas of membrane that remains not cleaned.

If permeate is supplied without pressure in the central permeate collector of a RO module, it is not able to reach peripheral parts of the membrane permeate channel due to pressure drop in the tightly wound membrane (see FIG. 2). At least 4 bar pressure has to be applied to the permeate in the central permeate collector 48, to transfer water to the membrane periphery. However, supplying water with pressure more than 0.5 bar may destroy the membranes due to their glued structure.

The methods where transfer from RO to DO process is based on decreasing the feed side gauge pressure have a few more disadvantages:

- The whole membrane moves in the RO module during gauge pressure reduction, which often causes leaks in interconnections between membrane elements;
- Every reduction of raw water pressure and subsequent transition from RO to DO process causes membrane sagging. The sagging causes local membrane elongation in-between the fibers of the feed-brine spacer and damage of its salt rejection layer. Large sagging can cause delamination and damage the membrane;
- Cleaning forces are limited to raw saline solution osmotic pressure, so that the method is not suitable for brackish water RO desalination systems and for sewerage water desalination.

The method where the permeate gauge pressure is raised to provide direct osmosis process has a limitation—to prevent membrane sagging in the feed direction, the gauge pressure at the permeate side must be kept significantly lower than the gauge pressure of the raw saline solution at the feed side. This requirement further limits the cleaning effect.

Thus, the purpose of the present invention is to overcome the above defects of the direct-osmosis cleaning methods and to provide an effective cleaning method which may be performed without stopping the RO desalination in a whole RO module, does not require special costly equipment, does not damage the membranes, is friendly to the environment and has numerous other advantages as will be shown below.

In accordance with the present invention, there is provided a direct-osmosis (DO) method for cleaning a semi-permeable membrane in a RO separation module. The membrane has a feed side with foulant located thereon and an opposite permeate side, a front feed end and an opposite rear brine end. The RO module comprises a vessel accommodating the membrane and having a feed port in fluid communication with the feed side at the front feed end of the membrane, a brine port in fluid communication with the feed side at the rear brine end of the membrane, and at least one permeate port in communication with the permeate side of the membrane. The normal RO separation process in the same module includes

- feeding, under gauge pressure $PGr$, raw saline solution comprising solvent and dissolved salt, and having osmotic pressure $POr$, to the feed port and further to the membrane feed side;
- collecting permeate having osmotic pressure $POp$ from the permeate side via the permeate port, under gauge pressure $PGp$; and
- removing residual brine from the rear brine end of the membrane feed side via the brine port.

The DO method of membrane cleaning is characterized in that super saline solution having osmotic pressure $POs>POr$ is fed for a predetermined injection time to the feed side of the membrane instead of the raw saline solution, such that backward flow of permeate towards the feed side is provided at least through a portion of the membrane so as to lift the foulant from the feed side.

The osmotic pressure $POs$ of the super saline solution may be higher than the gauge pressure $PGr$ but at least at the beginning of the super-saline injection it preferably does not exceed two times $PGr$.

The injection time of the super-saline feed is preferably determined as such time of feeding super saline solution with osmotic pressure $POs \cong 2\,PGr$ via the feed port that the osmotic pressure measured at the brine port reaches $1.8\,PGr$ at least for a second.

The osmotic pressure $POs$ of the super saline solution may be selected to be suitable for dehydration of aquatic living organisms on the membrane surface or the super saline solution may be selected to have high ionic strength and osmotic pressure $POs$ suitable for dissolving micro-crystals on the membrane surface, or selection may be made for both purposes.

Feeding of the super saline solution may be performed via the brine port and withdrawing via the feed port and vice-versa. Both directions may be alternated in one cleaning session.

The osmotic pressure $POs$ of the super saline solution may be varied during a cleaning session, for example from substantially above $PGr$ to substantially below $PGr$. For achieving osmotic pressures of the super saline solution higher than $2\,PGr$ without membrane sagging, two or more contiguous injections of super-saline solution may be used, of which the first one injects super-saline solution with osmotic pressure $POs<2\,PGr$.

The method of DO cleaning may further include change of one or both gauge pressures $PGr$ and $PGp$ during the predetermined time.

In one embodiment of the method, the gauge pressure $PGp$ is increased for a short time before feeding the super-saline solution, for example by throttling the permeate port. In this case, the osmotic pressure $POs$ of the super-saline solution may be substantially equal to the osmotic pressure of the residual brine, so that the residual brine may be used as super-saline solution.

The super saline solution may be one of the following:

- water solution of technical grade NaCl;
- residual brine supplied from another RO module performing normal RO separation process or from the same RO module;
- the raw saline solution or residual brine or super saline solution collected during previous cleaning session, concentrated and/or salt added;
- solution from natural source or waste product or solution of organic substance.

The super saline solution may comprise one or more of the additives or features like: cleaning additives, enzyme additives for bio-fouling removal, compounds active in bacteria dehydration, dissolved gases, tracing agent, higher temperature, or absence of oxygen.

The feeding of super-saline solution may be performed by a pressure exchanger for example in the following ways:

- using the pressure of the residual brine and a booster pump;
- using the pressure of the feed pump and a booster pump;

using the pressure of the feed pump and throttling said gauge pressure PGr to become lower than the pressure of the super-saline solution coming from the pressure exchanger.

The method of DO cleaning may be applied to a plurality of RO modules arranged in a multistage RO installation where residual brine obtained in an earlier stage is used as raw saline solution in a next stage of said installation. The DO cleaning may be performed separately in each stage of the installation and may include partial discharge of residual brine obtained in the stage where the DO cleaning is performed.

According to another aspect of the present invention, there is provided a direct-osmosis method for cleaning a semipermeable membrane having a "feed" side and an opposite "permeate" side, from foulants located at the feed side. The method includes:

exposing a portion of the permeate side to a weak solution (permeate) of low osmotic pressure POp and a corresponding portion of the feed side to a super saline solution of high osmotic pressure POs, POp<POs, so as to create a flow of permeate towards the feed side through the membrane separating the foulants from the feed side;

withdrawing a stream of the super-saline solution together with the foulants from the feed side; and displacement of the membrane so as to expose subsequent portions of the membrane to the low and high osmotic pressure solutions.

The cleaning method may include removal of the foulants from the stream of super saline solution, restoration of the osmotic pressure POs in the stream and returning it for cleaning of the subsequent portions.

The low osmotic pressure POp of the permeate may be maintained by adding new quantities of permeate and/or by desalination.

The permeate and the super-saline solution are preferably separated by a porous wall and the exposed portion of the membrane is held in sealed contact with the porous wall. The feed side of the membrane may be held in rolling contact or in sliding contact with the porous wall.

The super-saline solution is preferably held under gauge pressure PGr which is lower than the gauge pressure PGp of the permeate.

According to a further aspect of the present invention, there is provided a system for cleaning a semi-permeable membrane by the above direct-osmosis method, including:

a first container adapted for filling with weak solution (permeate) of low osmotic pressure POp;

a second container adapted for filling with super-saline solution of high osmotic pressure POs, POp<POs;

the two containers being formed such as to allow placing a portion of the membrane between them so that the feed side of the membrane is exposed to the super-saline solution while the permeate side of the membrane is exposed to the permeate;

the system further has means for displacement of the membrane so as to expose consecutive portions of the membrane to the super-saline solution and to the permeate.

The cleaning system preferably has means for withdrawing a stream of the super-saline solution from the second container, more preferably means for removal of foulants from the stream of super saline solution, restoration of the osmotic pressure POs in the stream and returning it in the second container.

The cleaning system may include means for maintaining the super-saline solution in the second container under gauge pressure PGr which is lower than the gauge pressure PGp of the permeate in the first container, for example a vacuum pump connected by a vacuum line to the second container.

The cleaning system may include means for maintaining the low osmotic pressure POp of the permeate in the first container.

According to one embodiment of the cleaning system, the first container is a flushing tank, preferably with means for maintaining the level of the permeate therein while the second container is a cylinder drum with horizontal axis and porous peripheral wall, mounted for rotation in said tank. The system further has means for tensioning the belt around at least a portion of the lower part of the peripheral wall so as to provide a sealing contact between the feed side of the membrane and the portion of the peripheral wall; and means for rotating the drum and advancing the belt, preserving the sealing contact between consecutive portions of the belt and lower portions of the peripheral wall.

For operation, the permeate tank is filled with permeate and the cylinder drum is filled with super-saline solution, preferably to a level not higher than the sealing contact between the belt and the peripheral wall.

The means for rotating the drum and advancing the belt may include a mechanized drive for rotation of the drum and/or brakes.

The means for tensioning the belt may include an entry roller and an exit roller with axes parallel to the drum axis disposed higher than the drum axis so that the belt can be wrapped around part of the periphery of each roller. The rollers may have independent drives or brakes.

The present invention offers a novel approach to membrane treatment. Instead of letting membranes to be fouled and later cleaning them by aggressive and environmentally problematic reagents every few months, the present invention offers keeping membranes continually clean by performing frequent, everyday, and short, several-second, simple backflushing sessions. The advantages of the invention are:

a) Transfer from RO to DO and back to RO process is performed fast and gently for the membrane;

b) Transfer from RO to DO and back to RO is performed without stopping the feed pump or pressure decrease;

c) Short time and small product loss for desalination plant shut-down for cleaning;

d) Transfer from RO to DO and back to RO without permeate pressure increase;

e) The membrane remains pressurized to the permeate spacer during DO cleaning process, without sagging and damage to membrane;

f) The preventive cleaning is effective and allows to keep the membrane continuously clean;

g) The membranes are not moving inside the RO module during transfer from RO to DO and again to RO as they do during feed pump stoppage;

h) The cleaning force is not dependent on the raw saline solution osmotic pressure, and can be regulated by the salt concentration of the injected super saline solution;

i) High cleaning force can be achieved without membranes sagging;

j) The DO cleaning of the invention is a process that rolls over the length of the RO module so that while a membrane performs RO process at the rear brine end, in the middle it may perform DO cleaning and at the front feed end—again RO process. The RO process in the front and the rear end supply permeate for the DO cleaning process;

k) Due to sucking-up permeate during the DO process, the flow velocity in the feed-brine channel is rising up and thus the flow strips the foulant from the membrane surface and the feed spacer more vigorously;

l) The super-saline solution can be prepared with table salt which can be reused so that discharge of cleaning reagents is not required;

m) There is no need to refurbish existing RO desalination plants with expensive stainless still permeate collectors;

n) The invention can be applied to desalination of low-salinity brackish and sewerage water.

o) The invention can be applied to cleaning of new membranes during their production or testing stage thereby increasing the salt rejection;

p) Osmotic pressure of the super-saline solution dehydrates bacteria in the same way as it sucks up water from the RO membrane, and prevents membrane bio fouling;

q) Due to its high ionic strength, the super-saline solution is able to dissolve micro-crystals, and prevent membrane scaling.

The present invention uses the natural osmotic pressure of a super-saline solution for membrane cleaning. Super-saline solution may be prepared from table salt with concentration below super saturation. Water produced with implementation of this invention is cleaner and healthier due to the fact that it does not include traces of aggressive cleaning reagents.

BRIEF DESCRIPTION OF THE DRAWINGS

In order to understand the invention and to see how it may be carried out in practice, a number of embodiments will now be described, by way of non-limiting example only, with reference to the accompanying drawings, in which.

DETAILED DESCRIPTION OF EXEMPLARY EMBODIMENTS

Figure 1:
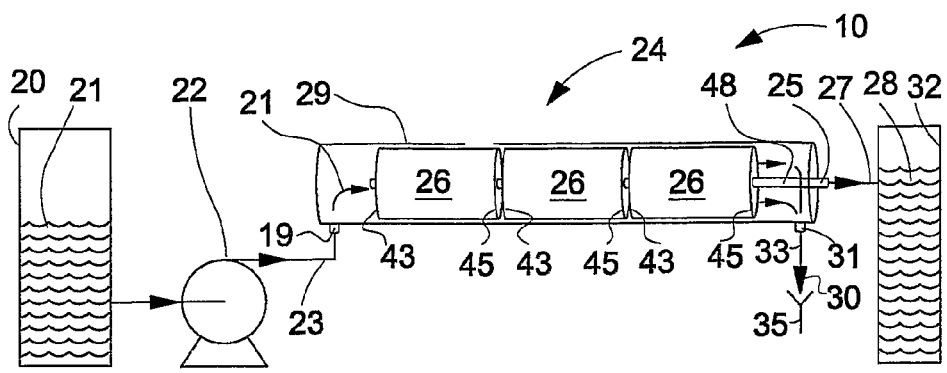
FIG. 1 is a scheme of a RO installation performing a normal RO separation process.

FIG. 1 shows a scheme of a RO installation 10 for water desalination comprising a raw saline solution tank 20, a high-pressure feed pump 22, a RO module 24, a permeate (product) tank 32 and a brine drain 35.

Figure 2:
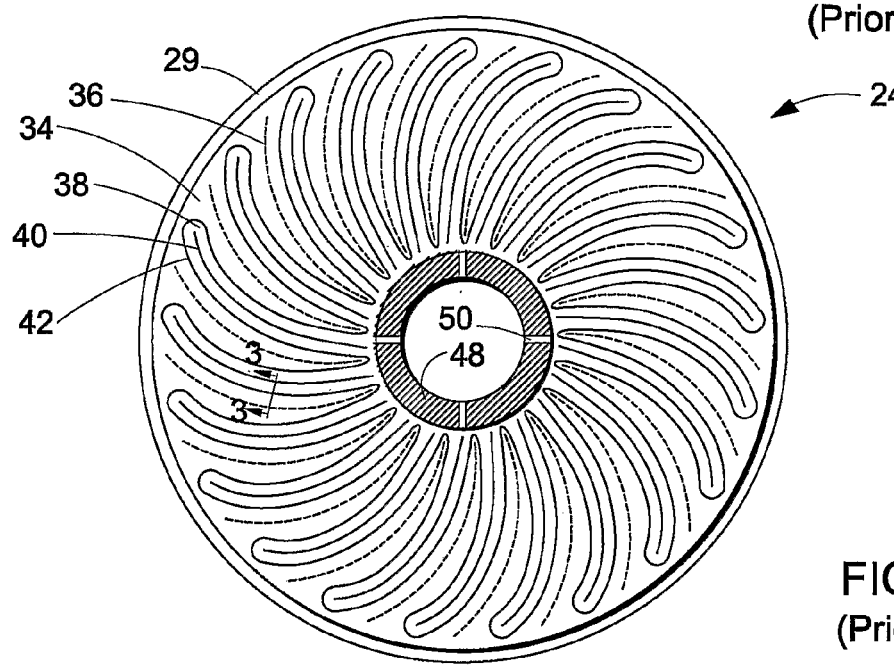
FIG. 2 is a schematic cross-section of a RO module.

With reference also to FIG. 2, the RO module 24 has an elongated cylinder housing 29 accommodating a number of membrane elements 26, a central permeate collector 48, a feed port 19, a permeate port 25, and brine discharge port 31. Each membrane element 26 has a front end 43 facing the feed port 19 and a rear end 45 facing the brine port 31. The membrane elements 26 are arranged in series on the permeate collector 48.

A schematic cross-section of the RO module 24 and a membrane element 26 is shown in FIG. 2. The membrane element 26 comprises a plurality of membrane sheets (membranes) 42 spirally folded around the permeate collector 48. Outer folds of the membrane sheets are separated by raw water spacers 36 and together with the housing 29 define feed-brine channel 34 which is in fluid communication with the feed port 19 and the brine port 31.

Inner folds of the membrane sheets 42 are separated by permeate spacers 40 and together with the permeate collector 48 defame permeate channel 38 which is in fluid communication with the inside of the permeate collector 48 via openings 50 in the wall thereof and further with the permeate port 25.

Figure 3:
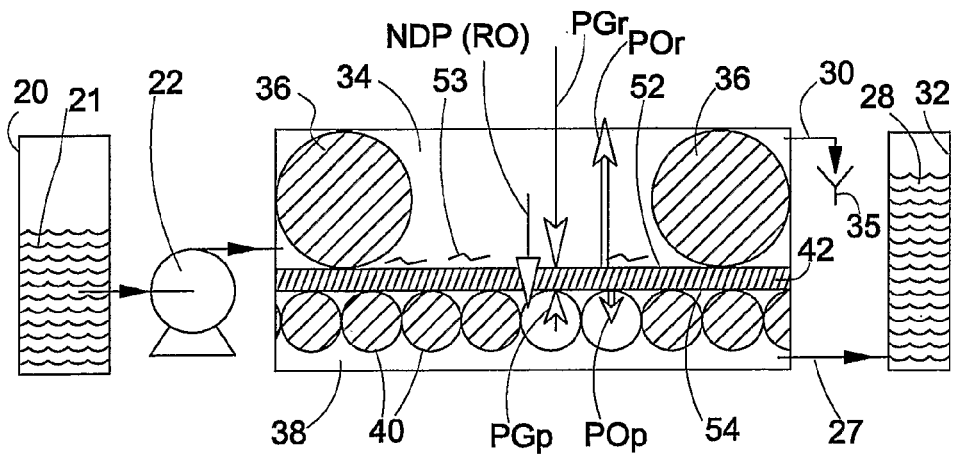
FIG. 3 shows a detailed schematic cross-section of a membrane element illustrating the process of reverse osmosis desalination.

With reference to the enlarged view in FIG. 3, the membrane 42 has feed side 52 facing the feed-brine channel 34, and permeate side 54 facing the permeate channel 38. The raw water spacers 36 in the feed-brine channel 34 are made of a plastic net with a relatively large distance of a few millimeters between its fibers. The permeate spacers 40 are made of a dense net with several fibers per millimeter.

In the normal RO separation process, the feed pump 22 supplies raw saline solution 21 from the tank 20 to the RO module 24 via feed pipe line 23 and the feed port 19. Raw saline solution 21 moves from the feed port 19 to the front end 43 of the first membrane element 26, exits through its rear end 45 and continues to the front end 43 of the next membrane element thereby passing through all membrane elements in the RO module. Salt separation takes place in the membrane elements 26. Product water (permeate) 28 is squeezed out into the central permeate collector 48 and leaves the RO module 24 via the permeate port 25. A pipe line 27 conveys the permeate to the permeate tank 32. Raw saline solution 21 concentrated during the desalination process into brine 30 is discharged from the RO module 24 via the brine port 31 and a brine line 33 into the brine drain 35.

FIG. 3 illustrates in more details the process of reverse osmosis desalination and the membrane fouling. The raw saline solution 21 has high osmotic pressure POr and is fed under high gauge (manometric) pressure PGr. The permeate 28 has negligible osmotic pressure POp and is withdrawn under low gauge pressure PGp. The RO process is driven by the balance of all the above pressures, herein called Net Driving Pressure (NDP):

$$NDP(RO) = PGr - POr - PGp + POp$$

When the NDP is positive, reverse osmosis takes place across the membrane and permeate (solvent) from the raw saline solution is squeezed to the permeate side. Exemplary values for a working RO installation are PGr=75 bar, POr=33 bar, PGp=1 bar, POp=0.3 bar. The NDP at the front end of the RO module is then:

NDP(RO)=75−33−1+0.3=41.3 bar

Figure 7A:
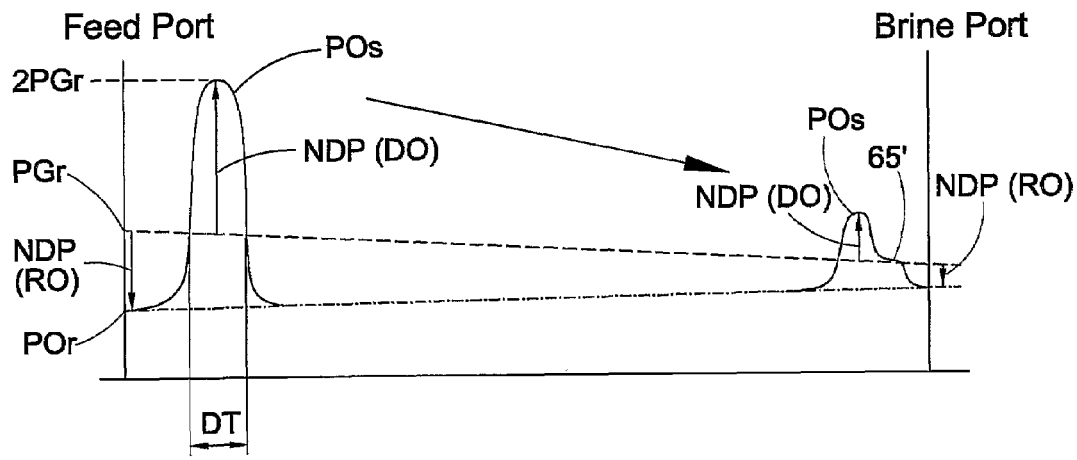
FIGS. 7A and 7B illustrate change of Net Driving Pressure along a RO module at different injection times of the super-saline solution.
Figure 7B:
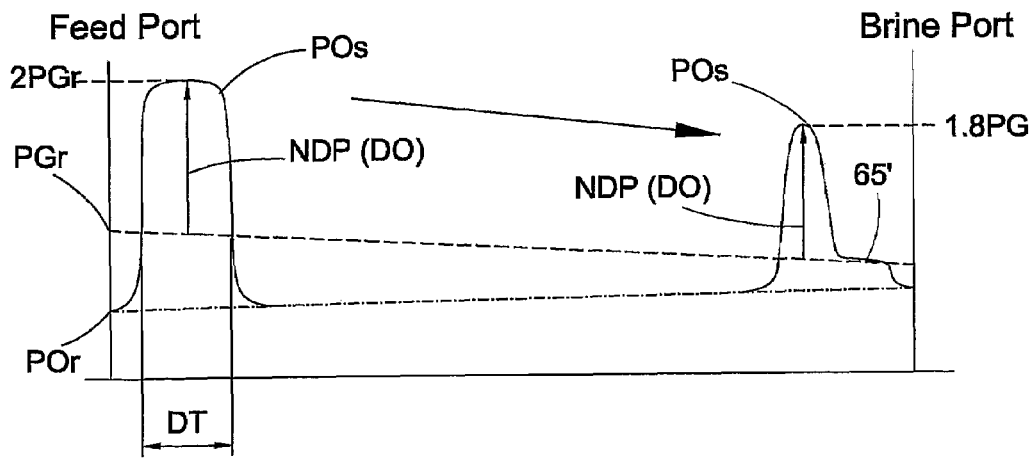

It will be appreciated that along the RO module, the NDP changes as the gauge pressure PGr of the raw saline water falls due to hydraulic losses, and the osmotic pressure POr grows with the salt concentration growing towards the brine port (see also FIGS. 7A and 7B). In the cited example, the osmotic pressure at the brine port POb may reach about 60 bar.

Fouling 53 accumulates on the membrane feed side 52 and on the spacer 36. As mentioned above, the fouling may comprise suspended solids including organic matter, scale, microcrystals, etc. Also bacteria and other microorganisms may attach themselves and grow on the membrane surface.

Figure 4:
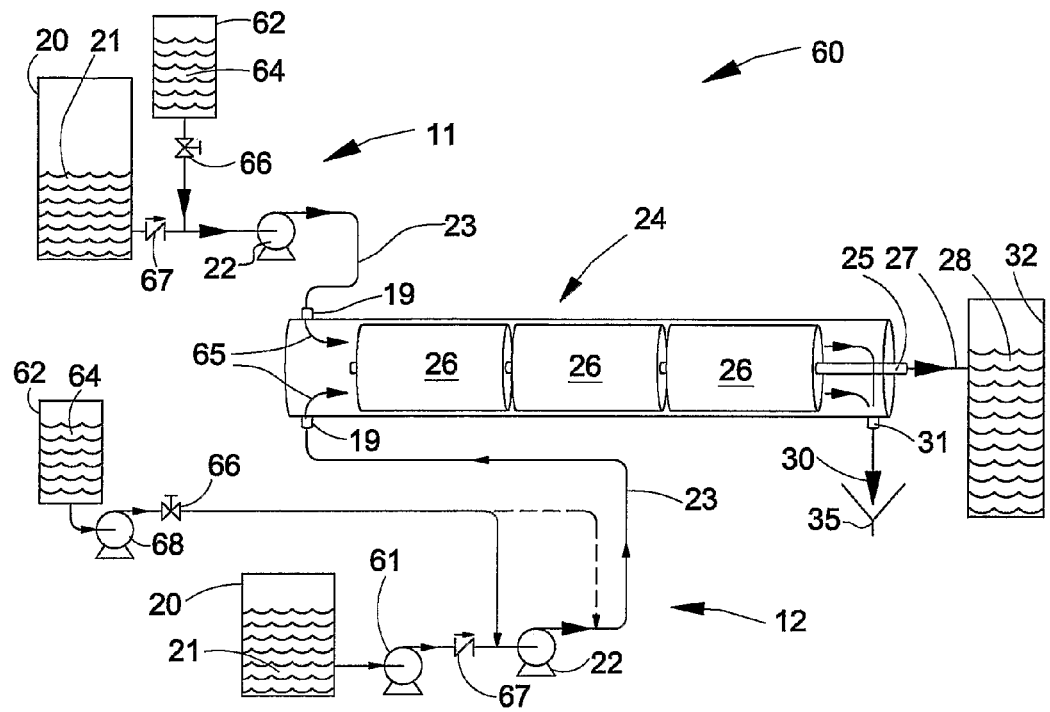
FIG. 4 is a scheme of the RO installation of FIG. 1 adapted for direct osmosis membrane cleaning according to the present invention.

A scheme of a RO installation 60 adapted for direct osmosis membrane cleaning according to the method of the present invention is shown in FIG. 4. The RO module 24 and other devices and details that are the same as in previous figures are designated by the same numerals. The RO installation 60, in addition to the equipment shown in FIG. 1, is completed with a subsystem 11 for injection of concentrated solution into the feed flow. The subsystem 11 comprises a tank 62 for concentrated solution 64, connected to the suction line of the high-pressure feed pump 22 via a pipe line with a stop valve 66. The raw saline solution tank 20 is connected to the same suction line of the feed pump 22 via check valve 67. If the raw saline solution tank 20 is open to the atmosphere, then the tank 62 should be installed, at higher level then the raw saline solution level in tank 20. The concentrated solution 64 has osmotic pressure POc higher or at least equal to the desired super-saline osmotic pressure POs.

The tank 62, connecting pipelines and valve 66 may be made of plastic material like polyethylene (PE) or polypropylene (PP) or Rainforest Fiberglass. However, they can be made from different corrosion-resistive materials. Almost all desalination plants are equipped with Cleaning In Place (CIP) systems that include suitable tanks, micronic cartridge filters and valves. Such CIP system can be used for injection of the concentrated solution 64.

Although FIG. 4 shows one module 24 for simplicity, in practice multiple RO modules can be installed in parallel to module 24 or in series. These modules can be arranged in groups.

To perform membrane cleaning procedure by the method of the present invention, the raw saline solution 21 has to be substituted for a predetermined time by super-saline solution with osmotic pressure POs substantially higher than POr. For this purpose, the operator opens the valve 66 for a few seconds. Opening and closing the valve 66 when the suction line to tank 20 is open allow smooth operation of the high-pressure feed pump 22. As the tank 62 is located at higher level than the raw saline solution in the tank 20, the concentrated solution 64 will enter into the suction line of the feed pump 22. The hydrostatic pressure of the concentrated solution 64 will also close the check valve 67. For mixing of solutions 21 and 64, the valve 66 has to be open partially.

The feed pump 22 sucks up mixed feed solution 65 from the suction line and pumps it via the pipe line 23 and the feed port 19 to the RO module 24. In this way, a portion of super-saline solution 65 with osmotic pressure POs is fed to the membrane elements 26 in the RO module.

Figure 5:
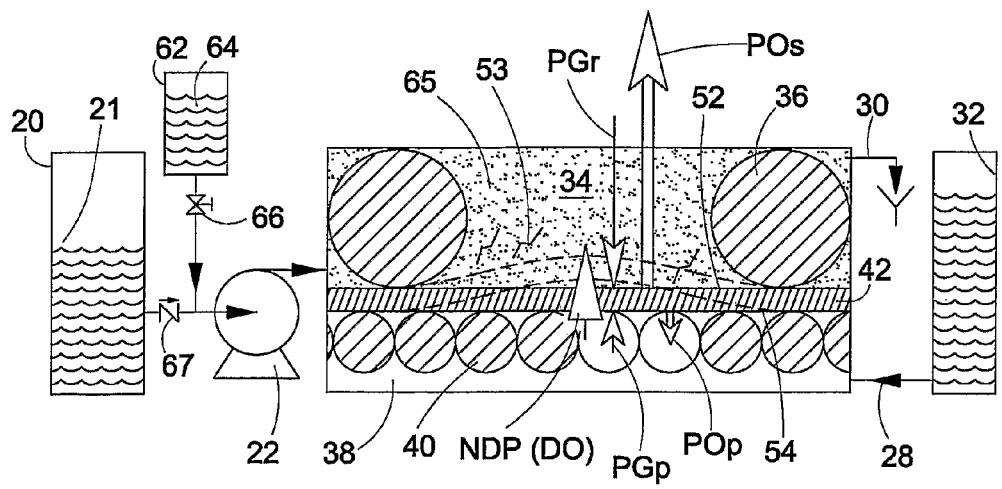
FIG. 5 shows a detailed schematic cross-section of a membrane element illustrating the process of DO membrane cleaning with super saline solution according to the present invention.

FIG. 5 shows a detailed schematic cross-section of a membrane element illustrating the process of direct osmosis membrane cleaning with super saline solution according to the present invention. As opposed to the normal RO operation shown in FIG. 3, when the valve 66 is open, the super-saline solution 65 with osmotic pressure POs flows through the feed-brine channel 34 instead of the raw saline solution 21. The Net Driving Pressure is now:

NDP=PGr−POs−PGp+POp

The osmotic pressure POs is selected such that the NDP becomes negative and the flow across the membrane 42 changes direction from reverse to direct osmosis process. The flow of permeate 28 changes direction accordingly and moves now from the permeate tank 32 to the permeate channel 38.

A numerical non-limiting example will be used to show the transfer from normal reverse osmosis (RO) desalination process to direct osmosis cleaning (DO) process. The raw saline solution 21 with osmotic pressure POr=33 bar is substituted by super-saline solution made of NaCl, 17% concentration, with osmotic pressure POs=130 bar. The gauge pressure at the feed port remains almost the same PGr=75 bar as in the normal RO process described above. The NDP of the direct osmosis process at the front end of the RO module will be:

NDP(DO)=75−130−1+0.3=..55.7 bar

Previously produced permeate 28 now penetrates back, and enters the interface between the membrane feed side 52 and the accumulated foulants 53, thereby separating the foulants from the membrane surface. The backwash solvent (permeate) and foulants mix with the super-saline solution 65 and are carried away with the brine 30.

The permeate 28 entering back the feed-brine channel 34 due to the direct osmosis process has strong mechanical cleaning effect which is created by increased flow velocity of the solution 65 moving through the feed-brine channel. This is caused by the additional water which is not passed to the permeate side; on the contrary, permeate is sucked back in those areas of the membrane where the solution 65 moves. The increased velocity strips the foulant from the membrane surface 52 and feed spacers 36.

It should be understood that the super-saline solution is fed for a relatively short period of time, much shorter that the time a portion of raw saline solution takes to pass from the feed port 19 to the brine port 31. Thus, while a portion of the super-saline solution 65 passes through the RO module 24, the normal RO process does not stop before and after the super-saline portion.

Figure 6:
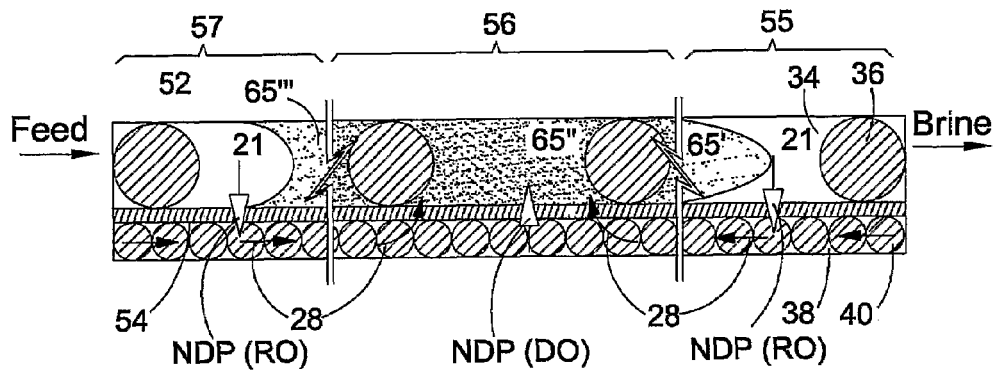
FIG. 6 is a schematic cross-section of three consecutive membrane elements showing the development of DO cleaning process along a RO module.

FIG. 6 shows schematic cross-sections of three different fragments of membrane elements 26 located along the RO module 24. Each fragment shows the feed-brine channel 34 with the raw water spacer 36, and the permeate channel 38 with the permeate spacer 40, as well as regions of different concentrations and directions of Net Driving Pressures.

Fragment 55 is located at the side of the brine port and contains raw saline solution 21 supplied before injection of the super-saline solution 65. Here, the normal RO is still carried out, as signified by the NDP (RO) arrow. At the left side of the fragment, enters the front part 65' of the injected portion, relatively diluted, where the super-saline solution is fully mixed with permeate 28 and is not able to suck up more permeate 28 (see also FIGS. 7A and 7B).

Fragment 56 is behind the fragment 55 and shows the main part 65" of the injected portion with highly concentrated super-saline solution. Here the NDP has changed its sign (direction) and DO cleaning is performed, whereby foulants are lifted from the membrane surface 52 and carried with the flow.

Fragment 57 is located at the side of the feed port and contains raw saline solution 21 supplied after the injection of the super-saline solution 65. Here, the NDP has changed its sign once more and the normal RO is resumed, as signified by the NDP (RO) arrow. At the right side of the fragment, leaves the trailing part 65''' of the injected portion with lower concentration.

As can be seen in FIG. 6, permeate 28 produced by the normal RO process before and after the portion of super-saline solution feeds the cleaning process.

The change of different pressures along the RO module is shown in FIG. 7A. Gauge pressure of the raw saline solution PGr falls towards the brine port due to hydraulic losses. Osmotic pressure of the raw solution POr gradually rises as the raw water is concentrated into brine losing the permeate. Gauge pressure of the permeate PGp and the osmotic pressure of the permeate POp are not shown as the former is approximately constant along membrane, while the latter is negligible.

The initial concentration of the super-saline solution 65 has to provide osmotic pressure POs substantially higher than the osmotic pressure POr of the raw saline solution 21 so that the process will be redirected from reverse osmosis to direct osmosis and provide cleaning by effective back-flow of permeate.

On the other hand, the back flow of permeate can cause membrane sagging in the direction of the feed-brine spacer 36 which has relatively large spaces of a few millimeters between fibers (shown in broken lines in FIG. 5). Sagging takes place during normal stoppage of the feed pump but can also occur if the osmotic pressure of the super saline solution is too high. That is why, the initial osmotic pressure POs of the solution 65 ought not to exceed the double value of the raw saline solution gauge pressure PGr.

FIG. 7A shows also the osmotic pressure POs of the super-saline solution 65 in two moments after the injection—shortly after the injection, close to the feed port (left side of the graph) and close to the exit from the brine port (right side of the graph). As POs falls during its movement along the membranes, closely to the brine port it may not provide an NDP value required for effective cleaning. Since the initial osmotic pressure of the super-saline solution is limited, the POs value at the brine port may be raised by feeding larger amount of the super-saline solution, i.e. by increasing the time of injection DT. Due to the fact that the osmotic pressure POr of the raw saline solution 21, the feed pump 22 gauge pressure PGr, and the type of membrane elements 26 can be different, the exact amount of concentrated solution used for one cleaning procedure has to be found experimentally, according to the maximal cleaning effect and the minimum spent solution 64.

For example, to determine the duration DT and quantity of the concentrated solution injection, salt concentration of the brine 30 may be measured at the brine port 31. It is recommended to adjust the duration of injection DT such that the osmotic pressure measured after injection at the port 31, for at least one second becomes 80% higher than the gauge pressure PGr of the feed pump 22 (given that the osmotic pressure of the injected solution about 2 PGr), as shown in FIG. 7B. Osmotic pressure may be calculated on the basis of the salt concentration.

Besides lifting the foulants, another cleaning effect of injecting the super saline solution may be dissolution of micro-crystals. Generally RO desalination process is designed according to the solubility limits of sparingly soluble salts. Sometimes super saturation conditions occur in feed-brine channel 34 and micro-crystals formation can be seen. Under certain conditions these micro-crystals can grow and create scaling of the feed-brine channel 34. Solution 65, due to its high ionic strength, is able to dissolve micro-crystals and therefore prevent system scaling.

Cleaning by super-saline solution may also achieve inhibition of bio-fouling by bacteria dehydration. Bio-fouling is the most severe form of membrane fouling and solution 65 can help inhibit its development.

As known, bacteria cells have a double layer—a cell wall and a cell membrane. The cell wall on the outside of the bacteria is composed of cellulose and is rigid. The cell membrane is a thin, flexible and elastic layer around the cytoplasm. The cell membrane is semi permeable and is similar to an osmotic membrane. The cell membrane sticks tightly against the cell wall.

The bacteria cell membrane act as a natural RO membrane and is pressed to the cell wall very much the same as the RO membrane 42 is pressed against the permeate spacer 40.

When the super-saline solution comes in contact with bacteria, the high osmotic pressure sucks up water from the cytoplasm in the same way as from the permeate channel 38 of the RO module 24. The cell membrane shrinks and detaches from the cell wall, which is rigid and does not shrink. Separation of the cell membrane from the cell wall is fatal for the bacteria, algae and fungi. This process is similar to RO membrane sagging and damage. For example, 20-25% NaCl concentration in the solution is enough to dehydrate most aquatic organisms.

For some bio-fouling forms, there may be a contradiction between high osmotic pressure POb required for fast shrinking of the bio-membrane, and the limits on osmotic pressure POsag that can cause RO membrane sagging. What is unwanted for the RO membrane (sagging and damage) may be necessary for removing of the bio-fouling.

This contradiction can be overcome by subsequent feeding "shots" of super-saline solution 65 with increasing concentration. It is critically important to increase the concentration continuously or in small steps.

As explained above, the direct osmosis process is short-lived due to increase in permeate salinity across the membrane. A few seconds after the first "shot", further increase of the osmotic pressure POs of the solution 65 will not cause increase in direct osmosis back-flow and in membrane sagging whereas bacteria cell membrane will shrink and will be damaged.

Further increase of the osmotic pressure POs may be beneficial for dissolving the micro-crystals.

The composition of the concentrated solution 64 used for producing of the super saline solution 65 of the present invention can be described as main component, alternatives, additives, and auxiliaries.

The main component may be NaCl dissolved in the raw saline solution, in brine or in permeate. Preferably, this is technical grade NaCl such as the salt used in water treatment industry for regeneration of ion exchangers. Non-supersaturated 25% solution of NaCl has osmotic pressure of 191 bar. Any natural salty water can be used for this application. Brine of the same desalination plant can be used with or without concentration. Brine from other plants can be used as super saline solution. Brine from a previous desalination stage can be used as super saline solution for the following stages. Sea water can be used as super saline solution for brackish or sewerage water desalination plants. Dead Sea water that has osmotic pressure above 300 bar can be used as super saline solution for desalination plants that operate on Mediterranean or Red Sea water. Salty waste products can be used also for this purpose.

As an alternative to the super-saline solution, organic compositions like sugar that have high osmotic pressure can be used.

Examples of additives are magnesium ion that helps in bacteria dehydration, or heavy metal ions such as silver that has bio-inhibition effect on bacteria membranes, or antibiotics. Dissolved gasses may be added, for example $CO_2$, for dissolution of $CaCO_3$ scale.

The super-saline solution may be heated, for example to 80° C. for better removal of the fouling, or deoxygenated for inhibition of aerobic bacteria growth.

An example of auxiliaries may be a tracing agent such as fluorescent dye. It may be used to control cleaning parameters such as flow, concentration, process duration, etc.

The super-saline solution 65 has a mechanical effect on the foulants in lifting them from the membrane surface and transporting out of the RO module. As the main component of the concentrated solution 64 is NaCl or similar salts which do not enter into any chemical reaction with the foulant components, the concentrated solution can be recovered and used repeatedly.

A very small volume of the solution 64 is required for each cleaning cycle. For example, three liter of the solution 64 are required for cleaning one RO module. A RO plant built of a hundred RO modules will need 0.3 $m^3$ of the solution 64 for each cleaning cycle which may be performed preventively once in two days or three times per day depending on fouling in the raw feed water. The same solution 64 can be used many times in a closed loop.

Figure 8:
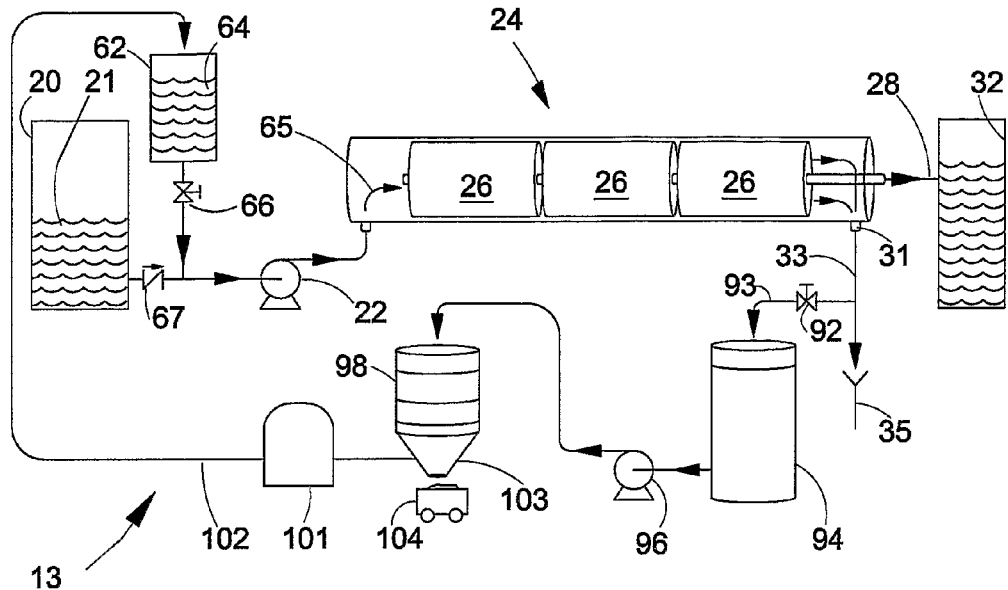
FIG. 8 is a scheme of the RO installation of FIG. 1 adapted for DO membrane cleaning according to the present invention, with a subsystem for purification, concentration, and reuse of the super saline solution.

FIG. 8 shows a scheme of the RO installation of FIG. 1 adapted for direct osmosis membrane cleaning according to the present invention, with a subsystem 13 for purification, concentration, and reuse of the concentrated solution. The subsystem 13 comprises a branching 93 of the brine discharge line 33 with a stop-valve 92, receiver tank 94, circulation pump 96, multi-media slow sand filter 98, evaporator 101 and return line 102. The slow filter 98 includes two layers of slow sand filter and one layer of granulated activated carbon.

Membrane cleaning in the RO installation of FIG. 8 includes the following:
1. Opening valve 66 for 5 seconds and pumping about 0.3 $m^3$ of the concentrated solution 64 in one hundred RO modules;
2. Opening the valve 92 when the salinity of brine 30 exceeds its ordinary value. About 2 $m^3$ mixture of the solution 65 with brine 30, foulant 53, and permeate 28 will be collected in the receiver tank 94;
3. Closing the valve 92 when the salinity of brine 30 falls back to its ordinary value;
4. Operating the circulation pump 96 to send the 2 $m^3$ mixture into the multi-media slow sand filter 98;
5. Filtrating the 2 $m^3$ mixture collected in one-minute cleaning session for the next 8 hours in the multi-media slow sand filter 98;
6. Sending filtrated mixture to evaporator 101 for concentration so as to reach the original parameters of the concentrated solution 64. Filtrated and concentrated mixture is delivered via the line 102 to the tank 62.
7. Every few months, dry filtration media including foulants are dumped into a trailer 104 and removed as dry compost.

The above-presented technology is essential for environmentally sensitive areas where discharge of brine with even slightly increased salinity is unwanted.

It will be appreciated that the concentrated solution can be injected in the stream of raw saline solution in different ways. FIG. 4 shows another variation of the many that can be implemented. The subsystem 12 is arranged for the case when the suction line to the feed pump 22 is pressurized by a booster pump 61. As it is not possible to inject the concentrated solution 64 by gravity, an injection pump 68 is employed. The injection of the concentrated solution 64 can be done at the suction side of the feed pump 22 but also can be done at the discharge side (shown in broken line).

Injection of the concentrated solution 64 at the suction side is most practical due to the fact that the CIP pump existing in all desalination plants is usually suitable for this application. Injection of the concentrated solution 64 at the discharge side is applicable for testing of this technology, when concentrated solution 64 is injected only into part of the RO modules connected to one feed pump 22. This injection scheme and the scheme shown in FIG. 9 below are also suitable when large size feed pump is supplying raw saline solution to several hundreds or thousands of RO modules 24, and the operator prefers to divide membrane cleaning between a few groups of modules.

Figure 9:
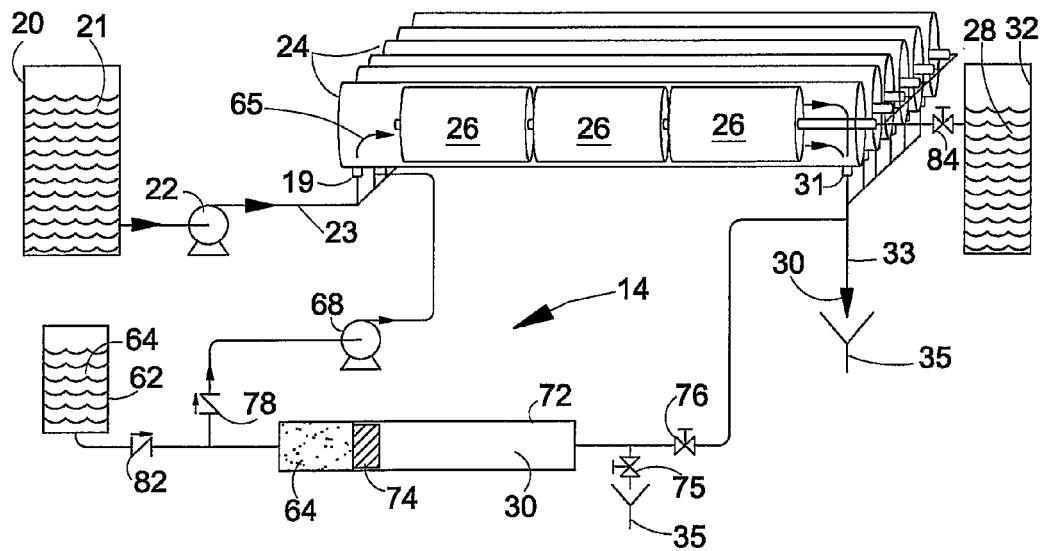
FIG. 9 is a scheme of the RO installation of FIG. 1 adapted for DO membrane cleaning according to the present invention where super saline solution is injected by a pressure exchanger and a boost pump.

FIG. 9 is a scheme of a RO installation adapted for direct osmosis membrane cleaning where the concentrated solution is injected by a pressure exchanger and a boost pump. Multiple RO modules 24 of the installation are shown connected in parallel. Injection subsystem 14 comprises a pressure exchange vessel 72 equipped with piston 74 separating the brine 30 at the right side of the exchanger from the concentrated solution 64 at the left side. The right side of the exchanger 72 is connected to the brine discharge line 33 and has a drain valve 75 connected to the brine drain 35. The left side of exchanger 72 is connected to the tank 62 via pipe line with check valve 82, and to the suction side of a boost pump 68 via check valve 78. The discharge line of the boost pump 68 is connected to the feed ports of the RO modules.

An operation cycle of the injection subsystem 14 comprises:
  a filling sequence where valve 76 is closed, valve 75 is opened and the boost pump 68 is not working. The check valve 78 is closed under the prevailing feed pressure at feed ports 19. Concentrated solution 64 flows by gravitation from the tank 62 via the check valve 82 into the exchanger 72, pushing the piston 74 to the right. Brine 30 from the right side of the exchanger is discharged via valve 75 to the brine drain 35 (to the atmosphere). The exchanger is filled with concentrated solution 64;
  an injection sequence where valve 75 is closed, valve 76 is opened and the boost pump 68 is operated. The right side of the piston 74 is exposed to the brine pressure which is transferred to the concentrated solution at the left side. The boost pump 68 supplies the concentrated solution 64 to the feed ports 19 raising its pressure above the feed pressure of the feed pump 22. The check valve 82 is closed under the prevailing brine pressure from the exchanger 72. The piston 74 moves to the left and the exchanger is filled with brine.

The injection scheme shown in FIG. 9 is especially cost-effective in seawater desalination where high-pressure large-size feed pumps 22 are used. When only part of thousands of modules 24 has to be cleaned simultaneously, the pressure of brine 30 can be used to decrease power costs for injection of the concentrated solution.

Figure 10:
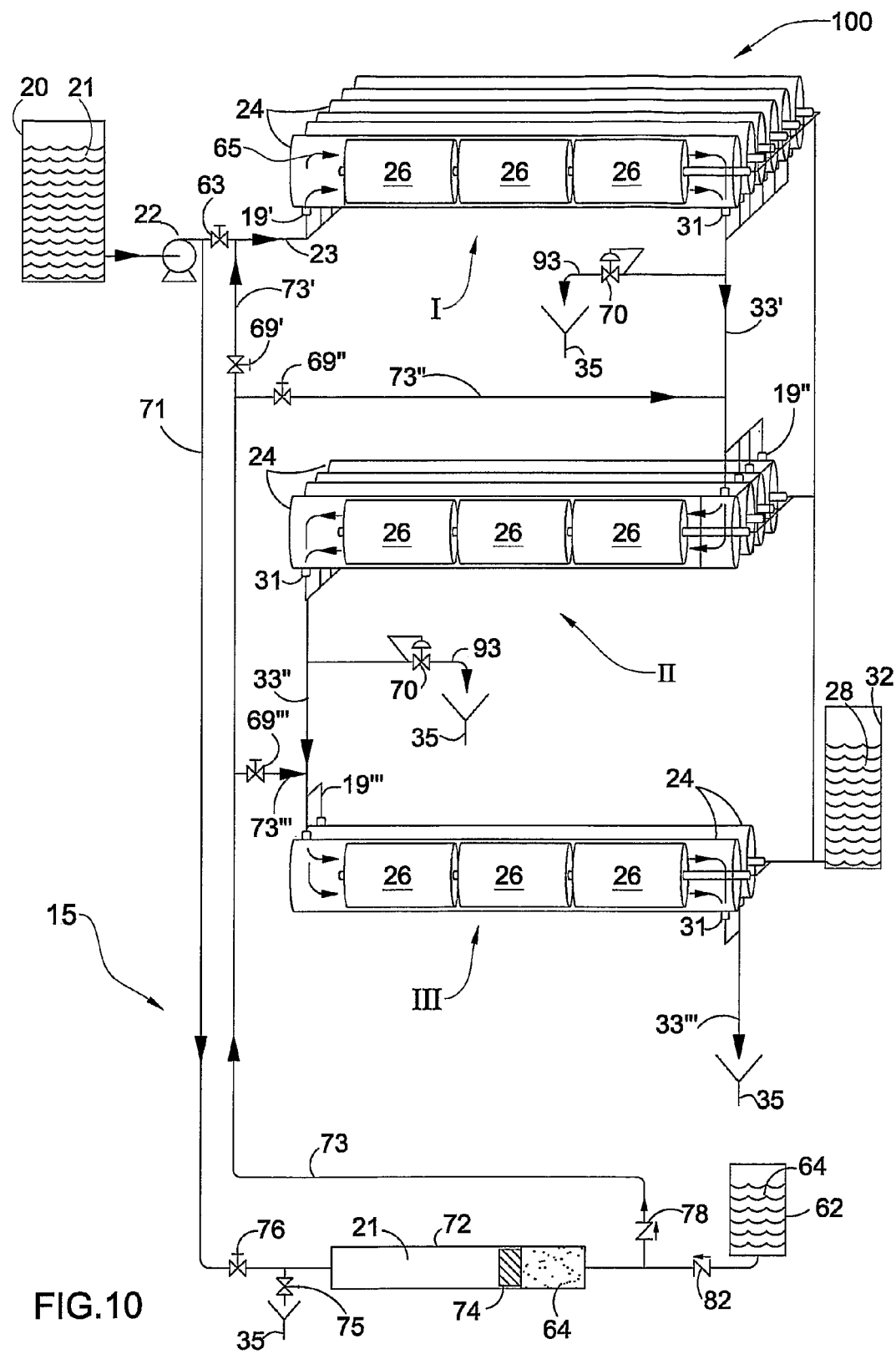
FIG. 10 is a scheme of a multistage RO installation adapted for DO membrane cleaning according to the present invention, where super saline solution is injected by a pressure exchanger without a boost pump.

FIG. 10 shows a multistage RO installation 100 adapted for DO membrane cleaning according to the present invention. In this installation, residual brine obtained in an earlier stage is used as raw water (raw saline solution) in a next stage. Multistage RO systems are widely used in brackish and sewerage water plants with high ratio of permeate flow to raw feed flow.

In the example of FIG. 10, the installation comprises three stages I, II and III. Brine discharge line 33' of the first stage is connected to the feed port 19" of the second stage, brine discharge line 33" of the second stage is connected to the feed port 19''' of the third stage, and brine discharge line 33''' of the third stage is open to the brine drain 35. Lines 33' and 33" are also called interstage lines in the multistage installation.

Stage I includes six modules 24, Stage II includes four modules 24, and Stage III includes two modules 24. The number of modules in successive stages decreases because residual brine flow diminishes from stage to stage since a significant part of the raw water flow leaves the system as permeate. This RO technology requires that the flow rate through each module is kept within certain range; especially exceeding a recommended maximal rate may damage the membrane.

An injection subsystem 15 for feeding the super-saline solution comprises a pressure exchange vessel 72 equipped with piston 74, similar to the one in FIG. 9. However, in this case the power for the injection is supplied from the outlet pressure of the feed pump 22 via a line 71 connected to the left side of the exchanger by a stop valve 76. The left side of the exchanger has also a drain valve 75. The right side of exchanger 72 is connected to the concentrated solution 64 in the tank 62 via pipe line with check valve 82, and to the feed ports of the three stages by pipeline 73 with check valve 78. Pipeline 73 has branches 73', 73" and 73''' that are connected to each respective stage via stop valves 69', 69" and 69'''.

A throttling valve 63 is located on the feed line 23 after the branching point of the line 71 but before the entry point of the branch 73' coming from the pressure exchanger 72.

The multistage RO installation 100 is complemented with discharge branches 93 with backpressure-valves 70 (relief valves) connected to brine discharge lines 33' and 33" between the stages.

Direct osmosis cleaning sequence may be performed separately in any of the stages. For example, an operation cycle of the injection subsystem 15 for cleaning Stage I comprises:

a filling sequence where valve 76 is closed, valve 75 is opened. The check valve 78 is closed under the prevailing pressure in line 73 (line 73 may be under the feed pressure or under the brine pressure of stages I or II, or totally shut off). Concentrated solution 64 flows by gravitation from the tank 62 via the check valve 82 into the exchanger 72, pushing the piston 74 to the left. Raw solution 21 from the left side of the exchanger is discharged via valve 75 to the drain 35 (to the atmosphere). The exchanger 72 is filled with concentrated solution 64;

an injection sequence where valves 80, 75, 69" and 69''' are closed, valves 76 and 69' are opened. The left side of the piston 74 is exposed via line 71 to the feed pressure which is transferred to the concentrated solution 64 at the right side. The throttling valve 63 is slightly closed so that the pressure in line 73 is slightly lower than the feed pressure. The pressure differential between the pipe line 71 and the pipe line 73 opens check valve 78 and the concentrated solution 64 is injected into the feed port 19' of the first stage. Check valve 82 is closed under the prevailing feed pressure from the exchanger 72. The piston 74 moves to the right and the exchanger is filled with raw solution 21.

It will be appreciated that an operation sequence in any of the other stages will be similar. However, throttling the feed pump 22 by the valve 63 will be unnecessary as any of the pressures in the interstage pipes 33' or 33" (depending which of the valves 69" and 69''' is opened) is lower than the feed pressure in the pipe 71. Also, a booster pump in the line 73' may be used instead of throttling the feed pump.

During DO membrane cleaning in any of the stages, the super-saline injection flow enters the first membrane element 26 in the module 24, sucks up permeate and thus the flow rate in the feed-brine channel increases towards the end of module. As explained earlier with reference to FIG. 5, the flow rate increase provides desirable stripping effect on the fouling. However, in the multistage system, the feed flow rate increase may exceed the recommended maximal rate per module and damage the membranes. This contradiction is resolved here by discharging the excess brine via discharge branches 93. The backpressure valves 70 are adjusted to open when the pressure in the brine discharge pipes 33' or 33" exceeds a preset value. The discharged brine may be collected and recycled as described for example with reference to FIG. 8.

Particular advantages of the method of the present invention for the multistage RO systems are:

Separate injection of super-saline solution in each stage improves uniformity of each stage cleaning;

Partial brine discharge from interstage pipe lines allows independent treatment of each RO stage and control over excessive stripping flow rate which may cause disruption in last RO stages.

Figure 11:
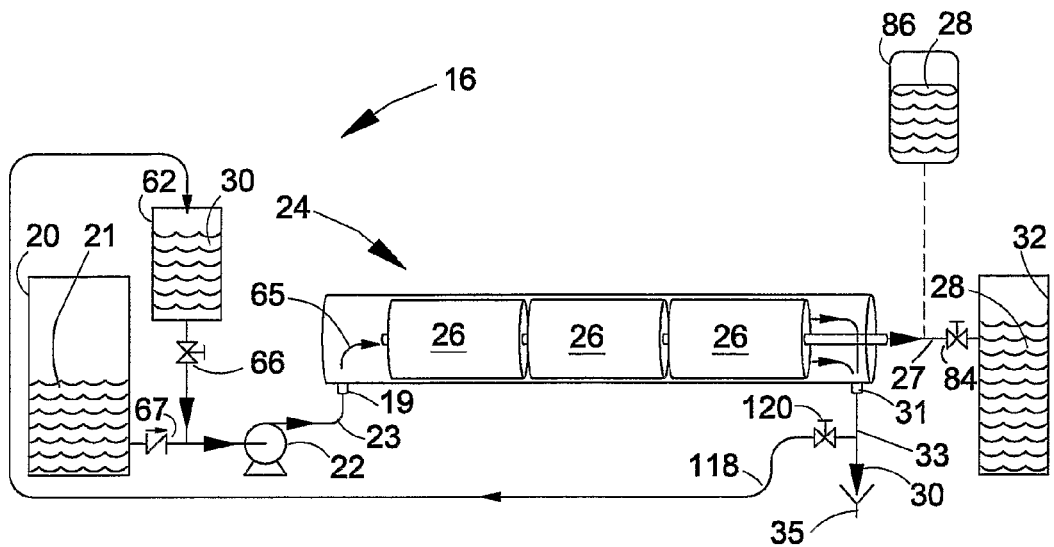
FIG. 11 is a scheme of the RO installation of FIG. 1 adapted for DO membrane cleaning according to the present invention where own brine of the RO module is used as super saline solution, and throttling of the permeate line is employed.

FIG. 11 shows a scheme of a RO installation adapted for direct osmosis membrane cleaning according to another embodiment of the present invention where own brine of the RO module is used as super-saline solution, and throttling of the permeate line is employed. The installation is similar to that of FIG. 4 but has an injection subsystem 16 comprising additionally a pipe line 118 with a stop valve 120 connecting the brine discharge line 33 to the tank 62, and a throttling valve 84 installed on the permeate pipe line 27 connecting the permeate port 25 and the permeate tank 32. Permeate port 25, pipe line 27 and valve 84 are made of materials suitable to withstand pressure equal to the raw solution gauge pressure PGr.

Optionally, the subsystem 16 may include a permeate accumulator 86 which is a vessel connected to the permeate line 27 between the permeate port 25 and the throttling valve 84. This vessel is adapted to receive permeate 28 and keep it under pressure PGp which allows maintaining permeate pressure more stable during cleaning.

Throttling (gradually closing) the permeate line 27 by the valve 84 allows increasing the permeate gauge pressure PGp in the permeate channel 38 (see FIG. 5) without a pump or any other special arrangement for this purpose. This simple permeate valve closing has significant effect on changing pressure forces on the membrane. In the first few seconds after the permeate valve 84 is closed, the gauge pressure PGp increases rapidly whereas permeate osmotic pressure POp increases slowly. The difference between the pressure increments will disappear in five minutes, but in the first few seconds it is very beneficial for redirecting the permeate back to the feed channel and allows increased efficiency of the direct osmosis cleaning which requires those few seconds.

As the permeate gauge pressure PGp is directed to the same side as the super-saline osmotic pressure POs, it is possible to reduce the osmotic pressure POs of the solution 65 and still to provide Net Driving Pressure for the direct osmosis cleaning process. For example, if permeate gauge pressure PGp is increased by ten bar, the osmotic pressure POs of the super-saline solution can be decreased by ten bar yielding the same NDP.

In fact, the permeate gauge pressure PGp may be increased so that the osmotic pressure POs may be lowered to the level of brine 30 osmotic pressure, whereby the brine 30 may be used as concentrated solution 64. In this case, solution 64 has to substitute the raw saline solution 21 and not be mixed with it. The limitation to rising the permeate gauge pressure PGp is membrane sagging as described above.

Preferably, brine 30 is collected for membrane cleaning in the tank 62 as concentrated solution 64 when the valve 84 is not throttled. This allows obtaining more concentrated brine. Obviously, using brine as super-saline solution is most suitable for seawater desalination.

The membranes of the RO installation with the injection subsystem 15 are cleaned by the following sequence:

1. Opening valve 120 and filling up tank 62 with brine 30;
2. Throttling the permeate line by valve 84 to build permeate back pressure;
3. Opening valve 66 for a few second and closing it; and
4. Opening valve 84 to release permeate back pressure.

The maximum permeate pressure PGp during the throttling is preferably not more than the feed gauge pressure minus half of the super-saline osmotic pressure POs which in this case is the brine osmotic pressure POb at the brine discharge port: PGp=PGr−POb/2=75−60/2=45 bar. The NDP of the direct osmosis cleaning process will be:

$$NDP(DO)=PGr-POb-PGp+POp=75-60-45+0.3=29.7 \text{ bar}$$

Figure 12:
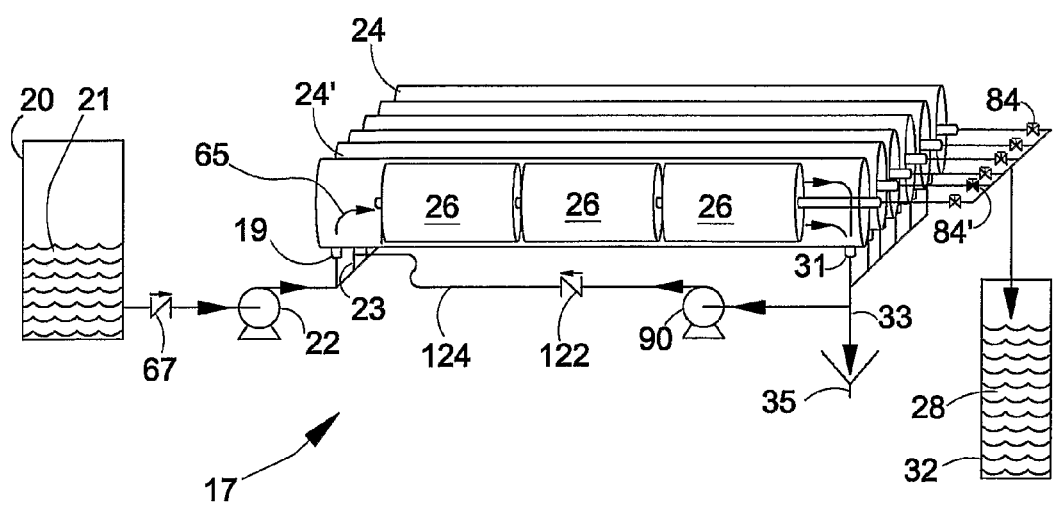
FIG. 12 shows a variation of the RO installation of FIG. 11 where own brine is injected by a pump sequentially in the feed port lines of groups of modules.

FIG. 12 shows a variation of the RO installation of FIG. 11 where brine is injected by a pump in turns to the feed port lines of groups of modules. Injection subsystem 17 in this case comprises a boost pump 90 connected by its suction line to the brine discharge line 33, and a solution injection line 124 connected to the feed pipe line 23 of a RO module 24', via a check valve 122. Throttling valve 84' belongs to the RO module 24'.

The RO module 24' symbolizes one group among many groups of modules 24 connected in parallel, typical for large desalination plans. Here, high pressure brine 30 is collected from a large group of modules 24 and is used for membrane cleaning in one group of modules at a time. Groups of modules are cleaned in sequence one after another. For this purpose, the line 124 is reconnected by means of valves (not shown) to other groups of modules 24. The benefit of this scheme is in power saving during injection of brine 30 to the feed line 23 of the currently cleaned module group 24'.

Figure 13:
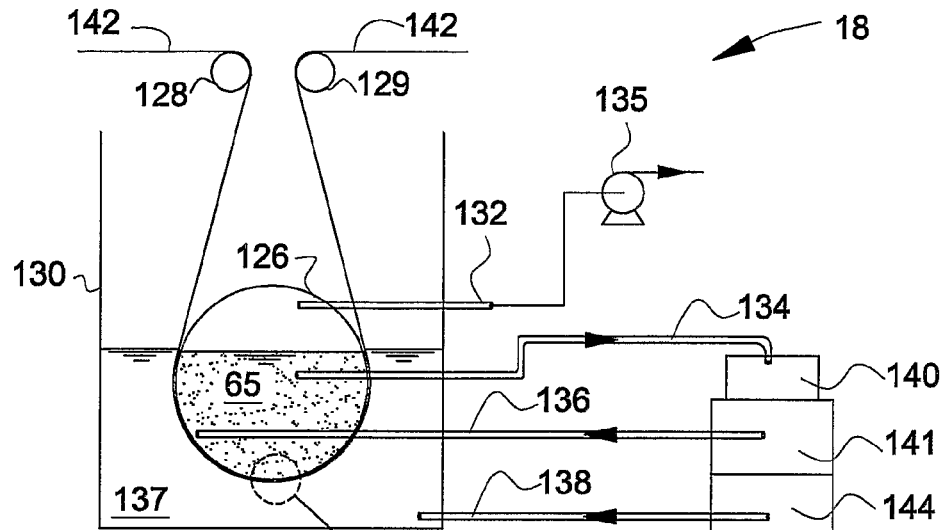
FIG. 13 is a scheme of a system for cleaning of separate membrane sheets according to the present invention.

With reference to FIG. 13, there is shown a cleaning unit 18 for cleaning semipermeable membranes having a "feed" side and an opposite "permeate" side from foulants located at the feed side by the direct-osmosis method of the present invention. For example, RO and nanofiltration membranes coming from production process have a salt rejection layer contaminated by residuary monomers and oligomers. Removal of these residual components improves membrane salt rejection. The removal may be performed during production of the membrane sheet, before assembly of membrane elements in a RO module.

The cleaning unit 18 comprises a membrane flushing tank 130, a hollow drum 126, supporting and tensioning rollers 128 and 129, powered drives (not shown), purification unit 140, evaporator 141, condenser 144, pipelines and pumps as explained below.

The hollow drum 126 has micro-porous peripheral wall and is mounted horizontally for rotation in the flushing tank 130. The supporting rollers 128 and 129 are mounted for rotation above the drum, with axes parallel to the drum axis.

A vacuum pipe line 132 connects the upper part of the drum cavity to a vacuum pump 135. An intake pipeline 134 connects the drum cavity to the purification unit 140 which is further connected to the evaporator 141. A return pipe 136 connects the evaporator 141 to the drum cavity.

The evaporator 141 has an evaporation chamber connected to the condenser 144 which is connected to the tank 130 by a distillate pipe 138.

The cleaning unit 18 is adapted for cleaning long membrane sheets of predetermined width equal or less than the width of the drum peripheral wall. A membrane sheet 142 is passed around the roller 128 (entry roller), under the drum 126 and around the roller 129 (exit roller). The sheet comes from a feeding reel before the entry roller, contacts the drum 126 along the lower part of the peripheral wall, and is wound on a receiving reel after the exit roller (the reels are not shown). The rejection layer is at the "feed" side 52 of the membrane 142 and contacts the porous wall of the drum 126. Drives and supports of the reels and rollers are adapted to ensure predetermined tensioning of the membrane sheet and sealing contact of the "feed" side 52 with the porous wall. The drum 126 may also have a drive or a brake so as to ensure sliding with respect of the membrane sheet if necessary.

In operation, the tank 130 is filled with distillate 137 to a level not higher than the contact zone between the membrane and the drum wall. The drum cavity is filled with super-saline solution 65 to about the same level as the distillate level in the tank 130. The membrane sheet 142 is then set in motion from the feed reel to the receiving reel, bringing the drum 126 in rotation.

Figure 14:
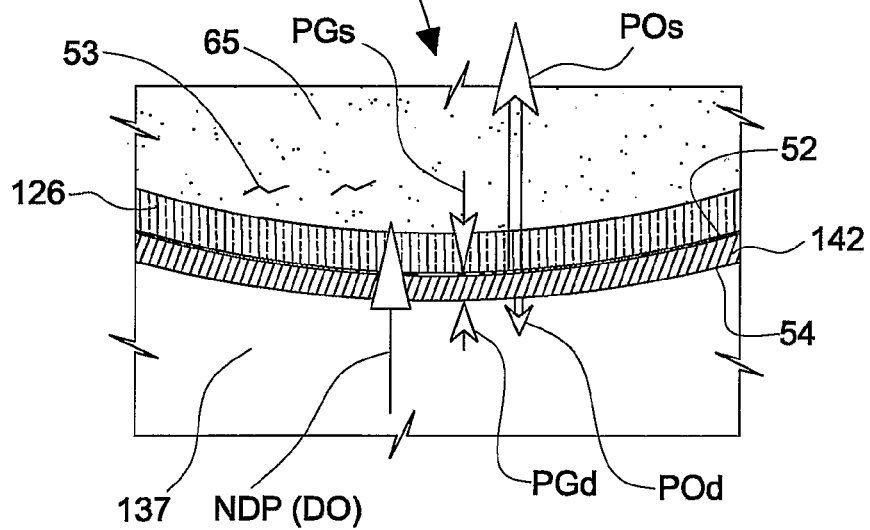
FIG. 14 shows a detailed schematic cross-section of a membrane element and the drum of the system in FIG. 13.

With reference to FIG. 14, an area of the membrane 142, while immersed in the tank 130 and tensioned against the porous wall of the drum 126, will be affected by four pressures: low osmotic pressure POd of the distillate 137, high osmotic pressure POs of the super-saline solution 65, distillate gauge pressure PGd, and solution gauge pressure PGs. The two gauge pressures include hydrostatic pressure and the air pressure above the respective free surfaces in the tank 130 and in the drum 126. The balance of pressures, similarly to the previous embodiment, is:

$$NDP=PGs-POs-PGd+POd$$

The Net Driving Pressure will be negative, i.e. directed inside the drum, because of the prevailing osmotic pressure POs of the super-saline solution. This means that distillate 137 will move through the membrane 142 into the drum 126 and lift residual monomers and oligomers from the "feed" side of the membrane 142.

As the distillate 137 penetrates through the membrane 142 into the drum 126 the osmotic pressure POs of solution 65 falls. Monomers and oligomers removed from the membrane surface contaminate the solution 65. The distillate level in tank 130 drops while the solution level in the drum 126 increases. To keep the system in balance, especially the Net Driving Pressure between feed surface 52 and permeate surface 54 of the membrane 142, the purification unit 140, evaporator 141, and condenser 144 are operated.

A stream of solution 65 is withdrawn from the drum, for example through an elongated suction nozzle extending close to the inner surface of the drum (not shown). The stream is flown via the intake pipe 134 into the purification unit 140 where monomers and oligomers are removed by filtration, for example via activated carbon or another sorbent. From the purification unit, solution 65 moves into the evaporator 141 where the solution is concentrated by evaporation to the original super-saline osmotic pressure. Then the super-saline solution is pumped through the return pipe 136 back to the cavity of the drum 126. Vapor from the evaporator 141 is moved into the condenser 144 and condensed back into distillate. The distillate is pumped back into the tank 130 via the distillate pipe 138.

The vacuum pump 135 may be operated to lower the air pressure in the drum 126, thereby preventing leakage of the solution 65 into the tank 130 and tighter contact of the membrane 142 to the drum peripheral wall.

The membrane sheet motion exposes successive parts of the membrane 142 to the cleaning action of the Net Driving Pressure. For better cleaning, the membrane sheet may be passed a few times forward and backward between the reels. Depending on the membrane type, different variations of contact between the membrane 142 and the drum 126 can be implemented. The contact may be also at the permeate side of the membrane, for cleaning that side (it will be appreciated that the terms "feed side" and "permeate side" are somewhat relativistic if the membrane is not mounted in a RO module). The membrane may be passed through the cleaning unit with a support layer similar to the spacer layers 36 or 40 described with reference to FIGS. 2 and 3. If the membrane width is less than the width of the drum peripheral wall, part of the latter may be screened by a suitable cover.

Although descriptions of specific embodiments have been presented, it is contemplated that various changes could be made without deviating from the scope of the present invention. For example, numerous combinations of main components, natural solutions, waste products, organic solutions can be used to perform the membrane cleaning process of the present invention. These combinations can be applied in different concentrations or flown to the membrane in different regimes in different desalination plants. New flat sheet membranes may be cleaned before membrane element assembly or after that, during membrane is element testing in membrane manufacture facility.

The invention claimed is:

1. Direct-osmosis (DO) method for cleaning a semi-permeable membrane in a reverse osmosis (RO) separation module, said membrane having a feed side with foulant located thereon and an opposite permeate side, a normal RO separation process in the same module including:

feeding by a feed pump, under gauge pressure (PGr), raw saline solution comprising solvent and dissolved salts and having osmotic pressure (POr) to said membrane feed side;

collecting permeate having osmotic pressure (POp) from said permeate side, under gauge pressure (PGp); and removing residual brine from said membrane feed side, the RO separation being driven by a positive net driving pressure defined by the balance of the pressures PGr, POr, POp and PGp, wherein said direct osmosis method of membrane cleaning comprises feeding to said feed side of the membrane, for a predetermined injection time, without releasing the gauge pressure PGr of the RO process, super saline solution (SSS) having an osmotic pressure POs>POr chosen such that the net driving pressure becomes negative, whereby there is provided a backward flow of permeate towards the feed side so as to lift said foulant from said feed side, wherein at the same time instance, both an RO separation process and a DO separation process take place simultaneously within the module.

2. The method of DO cleaning of claim 1, wherein the osmotic pressure POs of the super saline solution does not exceed two times the gauge pressure PGr.

3. The method of DO cleaning of claim 1, wherein the osmotic pressure POs of the super saline solution is higher than said gauge pressure PGr at least at a portion of said membrane.

4. The method of DO cleaning of claim 1, wherein said membrane has a front feed end and an opposite rear brine end, and said RO module further comprises a vessel accommodating said membrane and having a feed port in fluid communication with said feed side at the front feed end of the membrane, a brine port in fluid communication with said feed side at the rear brine end of the membrane, the normal RO separation process including feeding said raw saline solution to said feed port and removing said residual brine from said brine port.

5. The method of DO cleaning of claim 4, wherein said injection time is determined as being the time of feeding super saline solution with an osmotic pressure POs≈2 PGr via said feed port such that osmotic pressure at said brine port reaches 1.8 PGr at least for a second.

6. The method of DO cleaning of claim 4, wherein said cleaning is performed either by feeding of said super saline solution via said brine port and withdrawing it via said feed port, or by feeding of said super saline solution via said feed port and withdrawing it via said brine port.

7. The method of DO cleaning of claim 6, wherein the feeding via said brine port and feeding via said feed port are alternated.

8. The method of DO cleaning of claim 1, wherein, during a cleaning session defined within said injection time, said osmotic pressure POs of the super saline solution is varied in time.

9. The method of DO cleaning of claim 8, wherein a maximum osmotic pressure of the super saline solution POsmax>2 PGr is achieved by at least two contiguous injections of super-saline solution of which the first one injects super-saline solution with osmotic pressure POs>2 PGr.

10. The method of DO cleaning of claim 8, wherein the variation of said osmotic pressure POs is between substantially above PGr and substantially below PGr.

11. The method of DO cleaning of claim 1, wherein said super saline solution is selected from the group consisting of:
water solution of NaCl;
residual brine supplied from another RO module performing normal RO separation process;
residual brine supplied from the same RO module performing normal RO separation process;
said raw saline solution or said brine or said permeate with added salt;
residual brine collected during previous cleaning session, concentrated and/or salt added;
solution from natural source or waste product; and
solution of organic substance.

12. The method of DO cleaning of claim 1, wherein said super saline solution comprises one or more additive or feature selected from the group consisting of:
cleaning additives;
enzyme additives for bio-fouling removal;
compounds active in bacteria dehydration;
dissolved gases;
tracing agent; and
higher temperature.

13. The method of DO cleaning of claim 1, further including increasing of one or both gauge pressures PGr and PGp during said predetermined time.

14. The method of DO cleaning of claim 13, wherein said RO module has at least one permeate port in communication with said permeate side of the membrane for the collection of permeate, and increasing of said gauge pressure PGp is performed by throttling said permeate port.

15. The method of DO cleaning of claim 14, including accumulating and keeping pressurized permeate in fluid communication with said permeate port.

16. The method of DO cleaning of claim 1, wherein said feeding of super-saline solution to the feed side of the membrane is performed by a pressure exchanger in one of the following ways:
   using the pressure of said residual brine and a booster pump;
   using the pressure of a feed pump supplying said raw saline solution and a booster pump; and
   using the pressure of a feed pump supplying said raw saline solution and throttling said gauge pressure PGr to become lower than the pressure of the super-saline solution coming from the pressure exchanger.

17. The method of DO cleaning of claim 1, applied to a plurality of RO modules arranged in a multistage RO installation where residual brine obtained in an earlier stage is used as raw saline solution in a next stage of said installation, said DO cleaning being performed separately in each stage of said installation, wherein said method includes partial discharge of residual brine obtained in the stage where the DO cleaning is performed.

18. The method of DO cleaning of claim 1, wherein said foulant is deposited at the feed side of the membrane during membrane production.

19. The method according to claim 1, wherein the super saline solution comprises a concentrated solution mixed with said raw saline solution.

20. The method according to claim 1, wherein the injection time of said super saline solution is shorter than the time required for said raw solution to pass through the module.

21. The method according to claim 20, wherein during said injection time, said module has a front zone and a rear zone in which an RO separation process takes place, and an intermediate zone disposed between said front zone and said rear zone, in which a DO separation process takes place.

* * * * *

UNITED STATES PATENT AND TRADEMARK OFFICE
CERTIFICATE OF CORRECTION

PATENT NO. : 7,658,852 B2 Page 1 of 1
APPLICATION NO. : 11/629630
DATED : February 9, 2010
INVENTOR(S) : Igal Liberman It is certified that error appears in the above-identified patent and that said Letters Patent is hereby corrected as shown below:

Please add in the following on the cover page of the patent:

Related U.S. Application Data
(60) Provisional Application No. 60/580,915, filed on June 21, 2004

Column 20, Claim 9, Line 36
Please delete "POs>2 PGr"
and replace with -- POs<2PGr --

Signed and Sealed this

First Day of June, 2010

David J. Kappos
*Director of the United States Patent and Trademark Office*